INVENTOR.
FRITS RIENKS
BY
his ATTORNEYS

United States Patent Office 3,522,411
Patented Aug. 4, 1970

---

3,522,411
WELD POWER SUPPLY CONTROL SYSTEM
Frits Rienks, Groton, Conn., assignor to General Dynamics Corporation, New York, N.Y., a corporation of Delaware
Filed Nov. 28, 1966, Ser. No. 597,318
Int. Cl. B23k 9/10
U.S. Cl. 219—131      2 Claims

---

ABSTRACT OF THE DISCLOSURE

In the illustrative embodiment of the invention described herein, a pair of weld power supplies include biasing and control windings, respectively which control the levels of the unidirectional output welding currents supplied to welding arcs through electrodes of the arcs to sustain the arcs between the electrodes and workpieces. A pair of pulse control circuits which produce selectively spaced rectified alternating current signals and phase shifted alternating current signals, respectively, are selectively coupled to the biasing and control windings of the supplies to cause the supplies to supply selectively spaced higher unidirectional current levels to the welding arcs.

---

Figure 1:
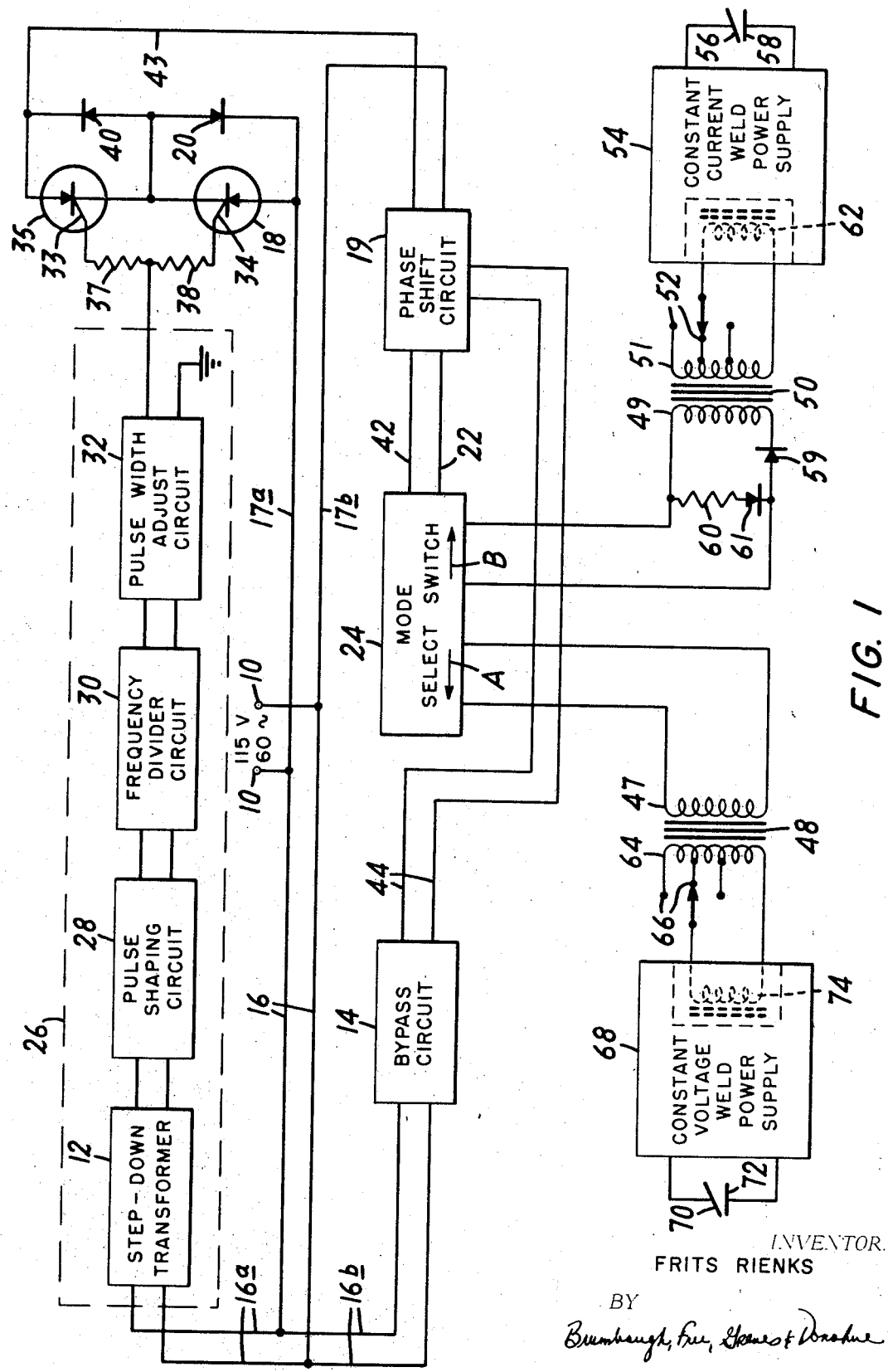

This invention relates to arc welding systems and, more particularly, to control apparatus for pulse controlled arc systems.

In presently devised pulse controlled arc welding systems of both the consumable (MIG) and the non-consumable electrode type (TIG), current is supplied to a welding arc in the form of discrete pulses rather than in a steady state form. In the MIG system, a pulse source is provided which feeds the welding arc in parallel with an existing source of constant background current. The background current source supplies current to the arc which is sufficient to maintain the arc without causing a transfer of metal from the electrode to the workpiece. The pulse source supplies discrete current pulses to the arc of a polarity corresponding to the polarity of the background current and of sufficient magnitude to produce the axial spray of metal from the electrode to the workpiece whenever the current pulses are added to the background current. In the TIG system, a pulse source is similarly provided which feeds the welding arc in parallel with an existing source of constant background current. For this application, however, the background current source supplies current to the arc which is sufficient to melt the workpiece and the pulse source supplies current pulses of sufficient frequency and magnitude to stabilize the welding arc. The stabilization is accomplished by virtue of the fact that the atmosphere between the electrode and the workpiece is ionized and a conductive path for the welding current is formed.

One disadvantage with presently devised pulse controlled arc welding systems lies in the fact that two distinct and separately operative power supplies are required to obtain either the stabilization of the welding arc or the intermittent axial spray of the weld metal. These power supplies require careful maintenance and monitoring because of their inter-relationship and in order to make certain that a high deposit rate type of welding process is always achieved and high quality weldments realized. Moreover, an adjustment in the setting of one power supply necessarily affects the setting of the other power supply. For example, if the amplitude or the frequency of the current pulses is changed, the amplitude setting of the background current must also be changed to compensate for the change in the pulsed current.

Accordingly, it is an object of the present invention to provide a pulse controlled arc welding system which overcomes the above-mentioned disadvantages of the prior art.

It is another object of the present invention to provide control apparatus for a pulse controlled arc welding system which overcomes the requirement for two separately operative power supplies.

It is still another object of the present invention to provide control apparatus for an arc welding system whereby high quality weldments are produced by a singular weld power supply.

These and other objects of the invention are accomplished by providing a weld power supply of the type adapted to supply unidirectional output to a welding arc through an electrode of the arc to thereby sustain the arc between the electrode and a workpiece, a transformer including an input winding and a variably tapped output winding coupled to the weld power supply and a source of selectively spaced current pulses coupled to the input winding of the transformer for driving the weld power supply to thereby permit the passage of selectively spaced higher unidirectional current levels to the welding arc.

For pulse controlled consumable electrode arc welding systems, the control apparatus includes a constant voltage weld power supply adapted to supply unidirectional current to a welding arc which is sufficient to melt the electrode without producing a metal transfer therefrom and the source of selectively spaced current pulses includes a variable frequency pulse control circuit adapted to transmit selected cycles of an applied alternating current voltage signal or selected portions of a gated direct current voltage signal to a phase control circuit, which is adapted to vary the phase of said cycles over a full 360° range before coupling them to the control input winding of the power supply. For pulse controlled non-consumable electrode arc welding systems, the control apparatus includes a constant current weld power supply adapted to supply unidirectional current to a welding arc which is sufficient to sustain the arc and melt the workpiece of the arc and the source of selectively spaced current pulses includes the aforesaid variable frequency pulse control circuit adapted to transmit said selected cycles to the control input winding of the power supply.

Figure 2:
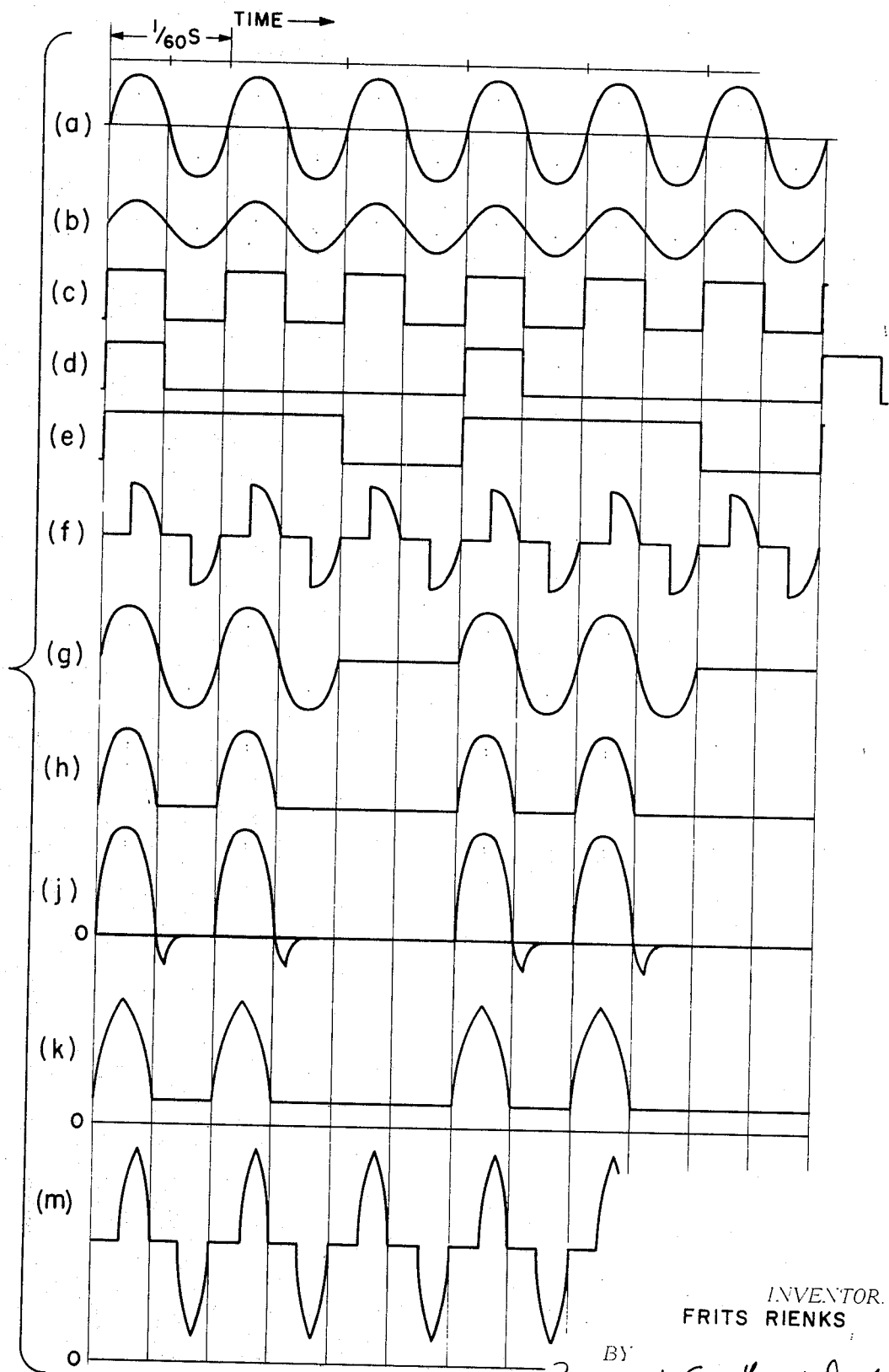

Further objects and advantages of the invention will be apparent from reading of the following detailed description thereof taken in conjunction with the following drawings in which:

FIG. 1 is a schematic block diagram illustrating the arrangement of one embodiment of the invention; and FIG. 2 is a graphical representation of waveforms which are useful in explaining the embodiment of FIG. 1.

In the illustrative embodiment of the invention, as shown in FIG. 1, a conventional 115 volt, 60 cycle A-C signal is applied across a pair of input terminals 10. The input terminals 10 are connected to a step-down transformer 12 and to a phase shift circuit 14 through conductors 16 and branch conductors 16a and 16b, respectively. Another pair of conductors 17a and 17b respectively couple one of the input terminals 10 to the anode of a silicon controlled rectifier (SCR) 18 and the cathode of a diode 20 and the other of the input terminals 10 through a phase shift circuit 19 to the input terminal 22 of a mode select switch 24. The transformer 12 constitutes the first circuit element in a variable frequency pulse control network 26, indicated by the dashed lines, the network 26 providing the pulse control for either consumable or non-consumable electrode arc welding and the bypass circuit 14 providing an alternate pulse control for consumable electrode arc welding at line frequency only.

In order to assist the description of the FIG. 1 embodiment, reference may be had to FIG. 2. FIG. 2a shows the 115 volt, 60 cycle signal applied to the step-down transformer 12 from the input terminals 10. The transformer 12, which may be of conventional type, reduces the applied 115 volt signal into an easy-to-work-with A-C voltage signal of approximately 15 volts, as shown in FIG. 2b. This 15 volt A-C signal is then applied to a pulse shaping circuit 28 wherein the signal is transformed into a pulsating D-C signal having an amplitude of 15 volts and the pulse width of approximately $1/120$ of a second or 8.3 milliseconds, as shown in FIG. 2c. Among the many conventional pulse shaping networks which may be employed in the instant invention, a Schmitt trigger circuit provides signals having the desired pulse width and amplitude.

Connected to the pulse shaping circuit 28 is a frequency divider circuit 30 which produces output pulses at various frequencies below the reference frequency of 60 cycles per second. One type divider circuit which has been employed successfully in the instant invention is a conventional ring counter employing silicon controlled rectifiers for the pulse shifting operation. As shown in FIG. 2d, the pulses produced by the divider circuit 30 have a pulse width of 8.3 milliseconds and occur every 66.7 milliseconds or at one-quarter the reference frequency. To produce a pulse occurring at the rate of 15 cycles per second, it should be understood that the divider circuit 30 requires only four silicon controlled rectifiers. As will be explained in detail hereinbelow, the extent to which the reference signal is frequency divided will depend upon the requirements of the arc in the welding system.

After the appropriate frequency division, the 8.3 millisecond pulses are applied to the input terminals of a pulse width adjust circuit 32 designed to variably adjust the pulse width of the pulses between approximately 8.3 milliseconds and 45 milliseconds. Pulse widening circuits are conventional and need not be explained in detail herein. However, one such circuit used with success in the instant invention includes a resistance-capacitance differentiating circuit interposed between the collector of a common emitter amplifier and the base of a second common emitter amplifier, the differentiating circuit further including a potentiometer for adjustment of the circuit time constant. FIG. 2e shows the pulse widened from the 8.3 millisecond pulse width to a 33.3 millisecond width. It is significant that the width of any pulse derived by the circuit 32 is restricted by the frequency of the counting operation in the divider circuit 30 in that the faster the counting action, the narrower the pulse width can be. For example, if the divider consisted of only two silicon controlled rectifiers, 8.3 millisecond pulses would be produced every 33.3 milliseconds or at one-half the reference frequency of 60 cycles per second. If these pulses were then widened by the circuit 32 to 33.3 milliseconds, the variable pulse control circuit 26 would generate a continuous gating signal.

The 33.3 millisecond pulse is thereafter applied simultaneously to the respective control gates 33 and 34 of an SCR 35 and the SCR 18 through a pair of current limiting resistors 37 and 38, respectively. The cathodes of the SCR's 18 and 35 are coupled together and to the anodes of the bypass diode 20 and a further bypass diode 40. As mentioned above, the anode of the SCR 18 and the cathode of the diode 20 are coupled together and to the conductor 17a. The anode of the SCR 35 and the cathode of the diode 40 are coupled together and through phase shift circuit 19 to another input terminal 42 of the mode select switch 24 through a conductor 43. Conductors 17b and 43 can also bypass circuit 19 directly to conductors 22, 42.

As heretofore mentioned, the 115 volt A-C signal of FIG. 2a is also supplied directly to the phase shift circuit 19 through the branch conductors 16b. The circuit 19 is of conventional construction and need not be described in detail herein. One such typical circuit which may be employed in the instant invention is a unijunction phase shift circuit, disclosed at page 62, FIG. 4.24 in the General Electric Silicon Controlled Rectifier Manual, third edition. FIG. 2f shows a typical output voltage signal from the circuit 19, the signal having undergone 50% full wave phase control. It should be understood, however, that the phase control ranging between 10 and 100% may be provided to suit the requirements of any particular arc welding system. The 50% phase controlled voltage signal is then applied to input terminals 22 and 42 of the mode select switch 24.

In the position indicated by the arrow A, the mode select switch 24, which may be of conventional construction, operates to connect the input terminals 22 and 42 to the primary winding 47 of a nonsaturable transformer 48. In the position indicated by the arrow B, the switch 24 operates to connect the input terminals 22 and 42 to the primary winding 49 of a second nonsaturable transformer 50. Transformers 48 and 50 may be air gap transformers or any other nonsaturable type. If desired, a conventional relay and associated contacts may be employed to perform the switching action.

When the switch 24 is operated to connect the terminals 22 and 42 to the transformer 50, a conductive path is provided for the 115 volt signal of FIG. 2a which is supplied to the SCR 18 and to the diode 20. As shown in FIG. 2e, a 33.3 millisecond gating pulse is supplied to the control gates 33 and 34 of the SCR's 35 and 18 through the current limiting resistors 37 and 38, respectively. Inasmuch as 33.3 milliseconds corresponds to two cycles of the applied 115 volt A-C input signal, this applied signal will be transmitted fullwave for two cycles and be open circuited for one cycle, as shown in FIG. 2g. This is true because the gating pulse enables the SCR's 18 and 35 to conduct when the proper amplitude relation exists between the anodes and the cathodes of the respective SCR elements. Accordingly, two positive half cycles of the applied 115 volt A-C input signal are transmitted through the SCR element 18 and the diode 40 and coupled through phase shift circuit 19 and through the switch 24 to the primary winding 49 of the transformer 50. Similarly, two negative half cycles of the applied 115 volt A-C input signal are transmitted through the diode 20 and the SCR element 35 and coupled through circuit 19 and through the switch 24 to the primary winding 49 of the transformer 50. A third cycle of the input signal will not be transmitted through the SCR's 18 and 35 because of the absence of the gating pulse of FIG. 2e. Alternatively, phase shift circuit 19 may be bypassed, if desired, by conventional means, not shown.

The secondary 51 of the transformer 50 is provided with taps 52 for use in varying the magnitude of the pulses supplied to a conventional magnetic amplifier constant current weld power supply 54. The power supply 54 is preferably of the type employing magnetic amplifiers in the biasing, control and output circuits to provide a constant D-C current to a welding arc established between an electrode 56 and a workpiece 58. Although the principles of the invention described herein are applicable to solid state weld power supplies, saturable reactor weld power supplies and the like, those supplies employing magnetic amplifiers are preferred because they require low control and bias current levels and because of their inherent fast response to applied current levels. One commercially marketed weld power supply which has been used with success in the instant invention is the Vickers constant current weld power supply. Also included within the primary circuit of the transformer 50 is a diode 59 connected in series with the primary winding 49 and a series connected resistor 60-diode 61 combination coupled across the winding 49.

Accordingly, with the switch 24 activated to the position indicated by the arrow B, two cycles of the 115 volt input signal are applied across the primary winding 49 of the transformer 50. The diode 59 clips the negative half cycles of the voltage signal while the resistor 60 absorbs the loss of the clipped negative half cycles to balance the load in the primary circuit of the transformer 50. The rectified voltage signals appearing across the input winding 49 of the transformer 50 are shown in FIG. 2h and the voltage signals appearing across the output winding 51 are shown in FIG. 2j. By suitable adjustment of the taps 52, reduced amplitude levels may be provided which will effectively drive the power supply 54. Further amplitude restriction may be implemented by inserting a resistor in series with the diode 59.

A winding 62 is shown within the power supply 54 which represents the biasing circuit of the supply. This winding is connected in series with the secondary winding 51 of the transformer 50. Under normal operating conditions, the biasing circuit is supplied with a D-C current from a rectifier within the supply 54 (not shown), the level of the current being inversely proportional to the output current of the weld power supply. This bias current partially saturates the magnetic amplifier of the supply 54 and thereby restricts the magnitude of the current supplied to the welding arc established between the electrode 56 and the workpiece 58. Preventing the bias current from flowing will cause the magnetic amplifier to desaturate and thereby permit the passage of a higher current level. By introducing the intermittent pulses of FIG. 2j into the bias circuit of the supply 54, the pulses having a polarity opposite to the polarity of the D-C bias current, the D-C current is partially neutralized and the magnetic amplifier of the supply 54 will become partially desaturated. This in turn will produce a momentary increase in the output current of the power supply, this output signal being shown in FIG. 2k.

As shown in FIG. 2j, the pulse coupling transformer 50 tends to overshoot, the negative going overshoot being of the same polarity as the D-C current flowing in the winding 62. This overshoot acts to quickly restore the partial saturation level of the magnetic amplifier because it contributes to the quantity of energy required to return the magnetic amplifier to its original state of partial saturation. It is noteworthy that if the transformer overshoot is inadequate to quickly restore the magnetic amplifier to partial saturation, full wave control pulses may be supplied to the winding 49 in the transformer 50 in order to hasten the recovery time of the magnetic amplifier. This is easily implemented by removing the series connected diode 59 from the input circuit of the transformer 50 as well as the diode 61 and the load balancing resistors 60.

It should be understood that the time separation existing between the control pulses supplied to the power supply 54 can be varied to suit the requirements of the welding arc created between the electrode 56 and the workpiece 58. When the welding arc is fairly stable, the number of silicon controlled rectifiers in the divider circuit may be increased to thereby increase the time separation between the pulses of FIG. 2d to as high as one second and the frequency divided pulses restricted to a pulse width of approximately 8.3 milliseconds by the circuit 32 such that only one-half cycle of the input signal is supplied to the supply 54 each second. For greater stabilization, as high as 60 pulses can be supplied to the winding 49 each second. This may be accomplished by properly selecting the number of silicon controlled rectifiers in the circuit 30 and by properly adjusting the values of the circuit elements in the circuit 32.

When the switch 24 is activated to the position indicated by the arrow A, the half-wave, full cycle signals of FIG. 2f are applied across the primary winding 47 of the pulse coupling transformer 48. The secondary winding 64 of the transformer 48 is provided with taps 66 for varying the magnitude of the voltage pulses supplied to a conventional constant voltage weld power supply 68. The supply 68 is similar to the constant current weld power supply 54 employed for non-consumable electrode arc welding in that it is of the type which employs magnetic amplifiers in the biasing, control and output circuits to supply a pulsating D-C current to a welding arc established between an electrode 70 and a workpiece 72, the electrode 70 being melted continuously by the welding arc. As mentioned above, the principles of operation described are applicable to various and different type weld power supplies but the magnetic amplifier type power supply is preferred because it requires minimal biasing and control current and because it responds quickly to varying arc loads. One commercially marketed magnetic amplifier weld power supply which has been used with success in the instant invention is the Vickers three phase constant voltage weld power supply.

Accordingly, when the switch 24 is activated in the direction indicated by the arrow A, the pulses from circuit 19 are coupled across the transformer 48 to a winding 74 which represents the control circuit of the power supply 68. Under conventional operating conditions, the level of the D-C current flowing in the control circuit is inversely proportional to the output current of the weld power supply 68. Under nonpulsating conditions, this output current is maintained at a level which is sufficient to melt the electrode 70 but which is not high enough to produce any transfer of metal to the workpiece 72. By introducing the pulses from circuit 19 into the control winding 74 of the supply 68, the D-C current initially flowing therein will become partially neutralized. This partial neutralization will, in turn, produce a momentary increase in the output current of the power supply which is of sufficient magnitude to produce an axial transfer of metal to the workpiece. A typical waveform of the pulsed current produced by the supply 68 is shown in FIG. 2m.

Referring to FIG. 2m, it is noticeable that the axial spray transfer of weld metal occurs 60 times a second in response to 60 positive half cycle current pulses, each of the pulses having a width of approximately 4.2 milliseconds. This means that the pulse magnitude must be sufficient to accomplish transfer within the 4.2 millisecond period and, accordingly, must be of such a level as to be equivalent to a steady D-C current which will produce a natural spray transfer frequency of at least 230 droplets a second, i.e., on the average of one every 4.2 milliseconds. In fact, as the pulse current is substantially sinusoidal, the peak current produced by the supply 68 must exceed the above-mentioned D-C current so that the effective work done by the sine wave pulse is equivalent to a rectangular pulse of amplitude equal to the above-mentioned D-C level. Accordingly, the peak pulse amplitudes are towards the high ranges of natural spray transfer current and not just merely above the minimum D-C level which produces the droplets. Although such currents are large compared to the steady state output current levels, the overall average current is not excessive because the pulse currents have a comparatively short duration, i.e., from 0.5 to 8.3 milliseconds with a repeat frequency of 60 per second. If the frequency is reduced, of course, the current pulses can be wider, while the peak demand can be correspondingly less.

It is noticeable that, unlike the pulses supplied to the primary winding 49 of the transformer 50, the control pulses which are supplied to the primary winding 47 of the transformer 48 contain both polarities. This is required to accelerate the essentially slow reaction time of the supply 68 such that a pulse of proper amplitude will be applied to the pre-melted electrode 70 to assure the detachment of a droplet typical of spray transfer once every 4.2 milliseconds. For consumable electrode arc welding, the negative overshoot of the transformer 48 cannot be solely relied upon to restore the magnetic amplifier of the supply 68 to a state of partial saturation.

The 115 v. A-C input may be by-passed if desired directly into phase shift circuit 19 through by-pass circuit 14. In this event, the input to transformer 48 is as shown in FIG. 2f, a succession of pulses from which none have been removed and possessing both positive and negative going pulses. Also in FIG. 2f the pulses are shown as being 50% phase shifted in circuit 19.

In operation, the applied 115 volt A-C input signal is simultaneously supplied to the variable frequency pulse control network 26, the anode of the SCR 18 and the cathode of the SCR 35 through the diode 20. In the control circuit 26 the applied input signal is shaped into a square wave, reproduced at a frequency below the frequency of the 115 volt input signal and then adjusted to a pulse width concomitant with the stabilization requirements of the welding arc established between the electrode 56, 70 and the workpiece 58, 72. This adjusted pulse is thereafter supplied to the control electrodes of the SCR elements 18 and 35 to thereby enable the SCR elements to transmit the applied 115 volt signal to the mode select switch 24. The unijunction phase shift circuit 19 operates to control the phase of the applied 115 volt input signal over a full 360° before the input signal is applied to the mode select switch 24. With the switch 24 in the position indicated by the arrow A, the input signal is supplied across the transformer 48 to the control winding 74 of the weld power supply 68. These pulses drive the magnetic amplifier of the supply 68 into a state of partial desaturation and output current pulses are thereby produced in the output circuit of the supply 60 which causes the axial transfer of weld metal from the electrode 70 to the workpiece 72. With the switch 24 in the direction indicated by the arrow B, the control pulses are applied across the transformer 50 to the bias winding 62 of the weld power supply 54. These pulses drive the magnetic amplifier of the supply 54 into partial desaturation and pulsed output current is thereby produced in the output of the supply 54 which stabilizes the welding arc created between the electrode 56 and the workpiece 58.

It will be understood that the invention is susceptible to considerable modification and not limited to the above-described illustrative embodiment. For example, the same transformer may be employed for both the power supplies 54 and 68. In this instance, additional switching would be required at the output of the transformer in order to switch the transformer between the power supply 54 and the supply 68. Accordingly, all such modifications and variations within the skill of the art are included within the spirit and intended scope of the invention as defined by the following claims.

I claim:

1. Control apparatus for pulse controlled non-consumable electrode arc welding systems, comprising weld power supply means for supplying unidirectional output current to a welding arc through an electrode of the arc to thereby sustain the arc between the electrode and a workpiece and melt the workpiece, said power supply having a magnetic amplifier constant current weld power supply with means for generating a unidirectional biasing current and a biasing circuit responsive to the biasing current for controlling the amount of unidirectional output current supplied to the welding arc, transformer means including an input winding and a variably tapped output winding coupled to the biasing circuit of the weld power supply means, and a variable frequency pulse control circuit adapted to transmit selective cycles of an applied alternating current voltage signal to the input winding of the transformer means to thereby permit the passage of selectively spaced higher current levels to the welding arc and thereby stabilize the welding arc by ionizing the atmosphere between the electrode and the workpiece, and wherein the variable frequency pulse control circuit comprises a step-down transformer adapted to restrict the amplitude of applied alternating current voltage signals, a pulse shaping circuit adapted to transform the amplitude restricted alternating current voltage signals into square wave pulses, a frequency divider circuit adapted to provide output pulses at repeat frequencies below the repeat frequency of the applied square wave pulses, a pulse width adjust circuit adapted to variably adjust the width of the frequency divided pulses and a pair of parallel-connected silicon controlled rectifier elements adapted to transmit selected cycles of an applied alternating current voltage signal to the input winding of the transformer means in accordance with the width and repeat frequency of the adjustably widened and frequency divided square wave pulses.

2. Control apparatus for a pulse control arc welding system comprising weld power supply means having a control means for supplying amplitude controlled unidirectional output current to a welding arc through an electrode of the arc to thereby sustain the arc between the electrode and a workpiece, transformer means including an input winding and an output winding coupled to the control means of the weld power supply means and variable frequency pulse control means adapted to transmit selected cycles of an applied alternating current voltage signal to the input winding of the ransformer means, the variable frequency pulse control means comprising a step-down transformer adapted to restrict the amplitude of applied alternating current voltage signals, a pulse shaping circuit adapted to transform the amplitude restricted alternating current voltage signals into square wave pulses, a frequency divider circuit adapted to provide output pulses at repeat frequencies below the repeat frequency of the applied square wave pulses, a pulse width adjust circuit adapted to variably adjust the width of the frequency divided pulses and a pair of parallel-connected silicon controlled rectifier elements adapted to transmit selected cycles of an applied alternating current voltage signal to the input winding of the transformer means in accordance with the width and repeat frequency of the adjustably widened and frequency divided square wave pulses.

References Cited

UNITED STATES PATENTS

| 3,071,680 | 1/1963 | Anderson et al. | 219—131 |
| 3,387,143 | 6/1968 | Waltrous | 307—265 X |
| 3,281,572 | 10/1966 | Oku et al. | 219—131 |

FOREIGN PATENTS 1,447,198   6/1966   France.

JOSEPH V. TRUHE, Primary Examiner

J. G. SMITH, Assistant Examiner

U.S. Cl. X.R.

323—6; 1—44